(12) United States Patent
Stacy et al.

(10) Patent No.: US 7,416,670 B2
(45) Date of Patent: *Aug. 26, 2008

(54) DUAL-CELL MECHANICAL FLOTATION SYSTEM WITH INTERMITTENT SKIMMING

(75) Inventors: Melvin Stacy, Baton Rouge, LA (US); Kenneth C. Tolmie, Spring, TX (US); James C. T. Chen, Houston, TX (US)

(73) Assignee: Cameron International Corporation, Houston, TX (US)

( * ) Notice: Subject to any disclaimer, the term of this patent is extended or adjusted under 35 U.S.C. 154(b) by 162 days.

This patent is subject to a terminal disclaimer.

(21) Appl. No.: 10/534,140

(22) PCT Filed: Nov. 7, 2002

(86) PCT No.: PCT/US02/35757
§ 371 (c)(1),
(2), (4) Date: Apr. 19, 2006

(87) PCT Pub. No.: WO2005/002733
PCT Pub. Date: Jan. 13, 2005

(65) Prior Publication Data
US 2006/0213840 A1     Sep. 28, 2006

Related U.S. Application Data

(63) Continuation-in-part of application No. PCT/US01/18336, filed on Jun. 7, 2001.

(51) Int. Cl.
*C02F 1/24* (2006.01)
*B01D 17/035* (2006.01)

(52) U.S. Cl. .............. 210/703; 210/744; 210/806; 210/739; 210/144; 210/148; 210/221.2; 210/320

(58) Field of Classification Search ............... 210/703, 210/221.2, 320, 806, 148, 144, 744, 739
See application file for complete search history.

(56) References Cited
U.S. PATENT DOCUMENTS 2,766,203 A * 10/1956 Brown et al. ............... 210/706
4,564,457 A * 1/1986 Cairo et al. ................. 210/704

(Continued)

*Primary Examiner*—Thomas M Lithgow
(74) *Attorney, Agent, or Firm*—Madan, Mossman & Sriram P.C.

(57) ABSTRACT

It has been discovered that a mechanical flotation system (10) having only two cells (18, 20) can be nearly as efficient as one having more cells, yet provide an apparatus with a considerably smaller footprint, significantly reduced capital and operating costs, as well as be resistant to floating oil recovery platform wave effects. The dual-cell mechanical flotation system (10) has, in sequential order, an inlet chamber (16) and two gasification chambers or cells (18, 20), each with at least one gas ingestion and mixing mechanism (32), and a discharge chamber (24). A common primary skim collection channel (40) atop the partition (44) dividing the gasification chambers (18, 20) efficiently channels away the bulk of the floating collected matter. At least one baffle (60) depending from the top of the vessel (12) near the primary skim collection channel (40) helps dampen the action of the fluid containing the suspended matter when the vessel (12) is affected by wave motion against the floating oil production platform. The liquid or froth levels (50, 66, and 76) can be intermittently raised for collection or otherwise lowered during periods of excessive turbulence (e.g. pitch or roll) to prevent clarified liquid from being collected with suspended matter.

17 Claims, 1 Drawing Sheet

U.S. PATENT DOCUMENTS 4,986,903 A * 1/1991 Canzoneri et al. ............. 210/90
4,990,246 A * 2/1991 Blazejczak et al. .......... 210/109

6,955,763 B2 * 10/2005 Stacy et al. ................. 210/703

* cited by examiner

DUAL-CELL MECHANICAL FLOTATION SYSTEM WITH INTERMITTENT SKIMMING

CROSS-REFERENCE TO RELATED APPLICATION

This application is a continuation-in-part of International Application Serial No. PCT/US01/18336 filed Jun. 1, 2001.

FIELD OF THE INVENTION

The present invention relates to methods and apparatus for removing suspended matter from liquid, and more particularly relates, in one embodiment, to methods and apparatus for separating suspended contaminants and/or oil from water, particularly on an offshore hydrocarbon recovery platform subject to pitch and roll.

BACKGROUND OF THE INVENTION

In many industries, including oil, paper and pulp, textile, electricity generating and food processing, there is an ever-present problem of contaminated water as a by-product of various processes. In particular, water is often used to aid in the production of oil and gas on offshore platforms. This water is usually pumped into a formation in order to be able to pump oil out. As a result, the water becomes contaminated with oil and solids encountered in the formation, and therefore cannot be disposed of simply by dumping it into the surrounding water. Accordingly, numerous methods and systems have been devised to reduce the contaminant content of this water to a level that allows discharge of the water into the sea.

One such system, disclosed in U.S. Pat. No. 4,255,262, comprises a device that mixes and disperses gas in the form of fine bubbles in liquid in a tank in an attempt to remove contaminants from the liquid flowing through the tank The gas is induced from the upper section of the tank downward into the liquid in the tank via a draft tube. The gas induction occurs as a portion of the liquid contained in the vessel is recirculated back through the individual cells or compartments using a centrifugal pump. The apparatus uses an electrically-driven mechanical skimmer assembly, which serves to remove contaminant-laden froth that accumulates above the liquid level section of the tank. The tank is rectangular-shaped.

The above-mentioned device suffers from various drawbacks. The skimmers are moderate- to high-maintenance items, particularly when used in corrosive environments such as may be encountered in the oil-producing and chemical industries. Also the rectangular tanks, by virtue of their construction, cannot withstand pressures in excess of 2 oz. per square inch (0.8 kPa) internal. This is particularly disadvantageous especially where system pressures upstream of the oil/water separator are prevalent or where noxious or lethal gases such as hydrogen sulfide are present. Furthermore, the rectangular tanks having the skimmers are limited in volumetric capacity because full utilization of the tank is not allowed. In addition, although these tanks are described as "gas tight", gas pressures are maintained by continuously venting to the atmosphere, which is a potentially dangerous practice if lethal or flammable gases are present.

U.S. Pat. No. 4,564,457, discloses another system for separating suspended matter from fluid. The device comprises a cylindrical tank having an inlet chamber, a plurality of gasification chambers, and a quiescent outlet chamber. A skim trough is disposed near the top of the tank, and extends the length of the gasification chambers into the outlet chamber. Vertical baffles that separate the individual chambers extend downwardly and are spaced from the bottom of the tank, allowing fluid to flow along the bottom of the tank from the inlet chamber to the outlet chamber. Each gasification chamber is equipped with an eductor nozzle assembly positioned centrally in the lower portion thereof. The nozzle assembly provides for recirculation of fluid pumped from the outlet chamber.

In operation, fluid enters the tank through the inlet chamber, passes successively through each of the gasification chambers, and into the outlet chamber, where a portion of the fluid is drawn off to be recirculated through the eductor nozzles. The balance of the processed fluid exits the outlet chamber for further treatment, discharge or storage, depending upon the application. The recirculated fluid is pumped through the nozzle assembly, each nozzle being fed by a common header supplied by a recirculation pump, and each nozzle being positioned co-centrically in an eductor throat assembly. Each eductor throat assembly is connected to a gas header, supplied by a gas volume in the upper portion of the tank common to the aeration chambers and the outlet chamber. The passage of the fluid at high velocity through the nozzles educts gas into the gasification chambers and the gas rises in the fluid in the form of small bubbles. The gas bubbles collect oil and/or suspended solid contaminants as they rise, forming a contaminant-laden froth at the top of the gasification chambers.

While this device presents definite advantages over that disclosed in U.S. Pat. No. 4,255,262, such as the elimination of the mechanical skimmer and problems associated therewith, the ability to operate at higher internal pressure, and better utilization of available tank volume, it suffers from some disadvantages. For example, flow out of the tank must be interrupted in order to remove the contaminant-laden froth from the tank. This can be disadvantageous when a continuous flow of fluid is desirable. Also, the skim trough extends through the gasification chambers into the outlet chamber, which permits froth to spill into the quiescent outlet chamber and contaminate the effluent. Furthermore, there is no means for removing contaminants that may accumulate at the top of the inlet chamber, and no means for venting gas, which may have been entrained in the influent, which accumulates in the inlet chamber. In addition, there is no means for retaining gas in the vessel when the skim outlet valve is opened, creating a potentially dangerous situation if noxious, lethal or flammable gases are present in the tank.

Another problem that is often encountered with the baffles terminating a distance above the tank bottom is that some portion of influent tends to pass under the baffles without being directed to a high turbulence area and contacted by gas bubbles.

Additionally, the velocity of flow in the degasification chamber is relatively high, which leads to insufficient final oil/water separation.

U.S. Pat. No. 4,782,789 relates to an induced static flotation (ISF) cell having an inlet chamber, a plurality of gasification chambers, and an outlet chamber. Contaminated liquid enters the inlet chamber, passes through the gasification chambers, and exits through the outlet chamber. Gas bubbles are introduced into the bottom of each gasification chamber and attract suspended contaminants and/or oil as they rise. A contaminantladen froth forms at the top of the cell, and is removed via a first skim trough in the outlet chamber. A liquid level displacement controller maintains the level of fluid in the gasification chambers adjacent and below the top of the first skim trough, the second skim trough being vertically adjustable to account for the difference in specific gravity between the liquid in the outlet chamber and the gasification chambers. A timer pulsing device raises the level periodically to provide additional skimming. Gas is recirculated from the top of the cell for introduction into the bottom of the gasification chambers.

Secondary baffles in the gasification chambers prevent a bypass by the liquid and gas of the turbulent area created by the gas flow above the eductor assemblies that deliver the gas into gasification chambers. By using a pair of baffles in the outlet chamber, the fluid retention time is increased to further improve the liquid/contaminants separation.

An invention related to an apparatus for the removal of suspended matter from a liquid, such as used for treatment of oil-containing water is disclosed in U.S. Pat. No. 4,986,903. A cylindrical, horizontal vessel is divided into a single gasification chamber by a partition that extends through the interior chamber of the vessel and allows fluid communication between the two chambers. A liquid to be treated is introduced through distribution header(s) adjacent a bottom of the vessel and/or an alternative inlet nozzle which is combined with a gas eductor in order to achieve a more intimate mixture of the gas and liquid. The gas eductor has its outlet slightly above the outlet of the distribution headers. The released gas bubbles carry oil and suspended matter towards the upper portion of the vessel, from which the froth is collected through a primary skim collection trough which extends through the gasification chamber and from a vertically adjustable (based on specific gravity) secondary skim collection funnel in the degasification chamber. Skim collection is accomplished through control of the liquid level in the vessel.

U.S. Pat. Nos. 5,011,597 and 5,080,780 also relate to an apparatus for removing suspended matter from liquid The apparatus has a single cell vertical cylindrical hydraulic flotation vessel that is provided with a separation wall to separate a lower gasification chamber from a middle degasification chamber and an upper gas chamber. A number of alternative arrangements are provided for controlling skim collection through controlling volume of liquid within the vessel and changing the volume of liquid through the use of an adjustable timer which intermittently sends signals to outlet valves of the skim collection outlet or of the treated liquid outlet. The apparatus provides for an alternative arrangement of introducing liquid into the vessel, so as to achieve more intimate mixing of gas and liquid introduced into the vessel.

It would be desirable if an apparatus could be devised to overcome some of the problems in the conventional systems for removing suspended matter from a liquid, particularly in systems used on floating offshore hydrocarbon recovery platforms where the action of the waves upon the apparatus tends to cause the suspended matter to contaminate the recovered water.

SUMMARY OF THE INVENTION

Accordingly, it is an object of the present invention to provide an apparatus for removing suspended matter from a liquid, which apparatus is particularly suited to be used on floating offshore hydrocarbon recovery platforms.

It is another object of the present invention to provide a two-cell, mechanical, cylindrical gas flotation machine having a reduced footprint, reduced power requirements and reduced capital and operating costs that overcomes the adverse wave effects on floating platforms.

In carrying out these and other objects of the invention, there is provided, in one form, an apparatus for removing suspended matter from a liquid, which apparatus includes a vessel for receiving a flow of liquid having suspended matter therein. The vessel has a plurality of partitions sequentially dividing the vessel into an inlet chamber, at least a first gasification chamber and a second gasification chamber, and an outlet chamber, where each adjacent chamber fluidly communicates with one another. The vessel also has a discharge chamber having a fluid communication with the outlet chamber. The apparatus includes an inlet to introduce the flow of liquid into the inlet chamber and an outlet for removing clarified liquid from the discharge chamber. The apparatus includes a mechanism for ingesting and mixing gas into the liquid of each gasification chamber for creating a turbulent area and for attracting the suspended matter and for carrying the suspended matter to an upper portion of the vessel. The interface of the gas and liquid is termed a liquid level or froth level. Also included is a primary skim collection channel extending at least partially along the top of the partition between the first gasification chamber and the second gasification chamber for collecting suspended matter in the upper portion of both gasification chambers. A controller is present for regulating the height of the liquid level in response to the movement of the vessel. The liquid level may be lowered during times of pitching and rolling of the vessel (caused by pitching and rolling of the floating offshore hydrocarbon recovery platform) and then raised for collecting suspended matter. Finally the invention optionally includes at least one baffle near the primary skim collection channel to dampen motion of the liquid caused by movement of the vessel.

BRIEF DESCRIPTION OF THE DRAWINGS

The single FIGURE is a schematic, cross-sectional illustration of one embodiment of the dual-cell mechanical flotation system of the invention.

It will be appreciated that the FIGURE is a schematic illustration that is not to scale or proportion to further illustrate the important parts of the invention.

DETAILED DESCRIPTION OF THE INVENTION

Figure 1:
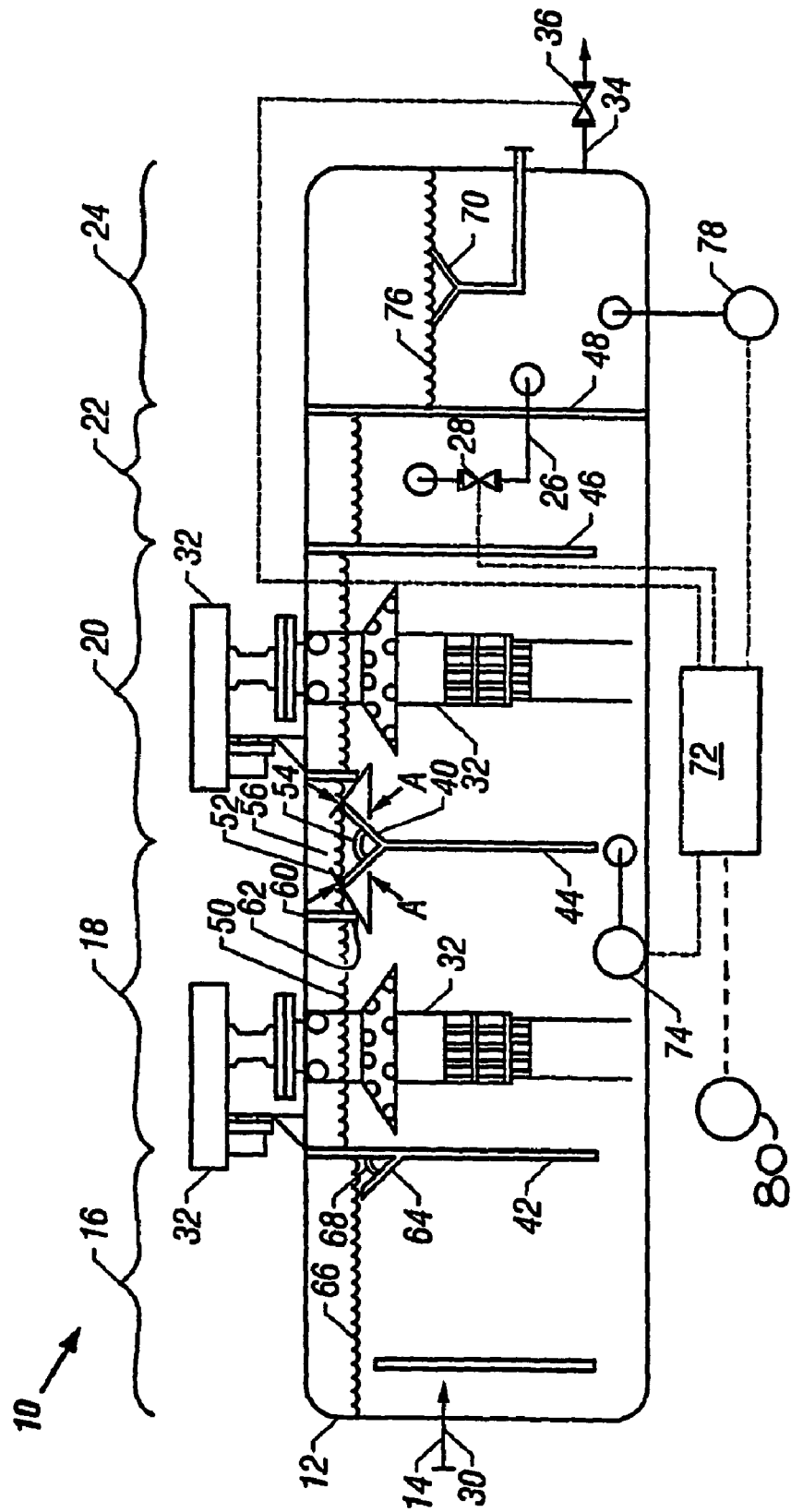

The present invention will now be described, by way of example, and not limitation, with the influent being water contaminated with oil and other suspended particulates. It is to be understood that the present invention has utility in numerous applications in which it is desirable to separate suspended matter and/or oil from a liquid, and that the suspended matter, the liquid, or both may be the desired product of the process.

Referring now to the FIGURE, the system 10 of the apparatus of a preferred embodiment of the invention includes a vessel 12 for receiving a flow of liquid 14 having suspended matter mixed therewith, where the vessel 12 in a preferred embodiment has a continuous cylindrical sidewall and is capable of withstanding substantial internal pressures as may be encountered when processing produced water from an oil well. Vessel 12 is divided into an inlet chamber 16, at least a first gasification chamber 18, a second gasification chamber 20, and an outlet chamber 22, where each adjacent chamber can fluidly communicate with one another, that is, that a fluid in one chamber may flow into an adjacent chamber. Vessel 12 also has a discharge chamber 24 that is in fluid communication 26 with outlet chamber 22, the fluid communication 26 generally being a pipe having a valve 28 therein. The chambers 16, 18, 20, 22 and 24 are divided by a plurality of generally vertical partitions 42, 44, 46, and 48, respectively. Partitions 42 and 46 extend from the top of vessel 12 downward, and are spaced from the bottom of vessel 12 to allow fluid communication between the adjacent chambers. Partition 44 dividing first and second gasification chambers 18 and 20, respectively, besides being spaced from the bottom of vessel 12 is also spaced from the top thereof to allow gas communication between these chambers as well; partition 44 being supported by the sides of vessel 12. Partition 48 dividing outlet chamber 22 and discharge chamber 24 extends completely from the top of vessel 12 to the bottom sealing the entire circumference at that point, except for fluid communication 26. The lengths of partitions 42, 44 and 46 are calculated to minimize the effect of pressure differential due to difference in flow rates under each respective partition. Fluid communication 26 could be any other suitable passageway having a flow control device regulating flow therethrough.

Inlet chamber 16 has an inlet 30 to introduce the flow of liquid 14 to the inlet chamber 16. Each gasification chamber 18 and 20 has at least one mechanism 32 for ingesting and mixing gas into the liquid of each respective gasification chamber 18, 20 for creating a turbulent area where the gas attracts the suspended matter and carries the suspended matter to an upper portion of the vessel 12 for each respective chamber 18, 20. Gas ingesting and mixing mechanisms 32, in one non-limiting embodiment, are preferably the devices of U.S. Pat. No. 3,993,563, incorporated by reference herein, although it will be appreciated that other devices, including but not limited to, simple aerators, may be used. Mechanisms 32, such as described in U.S. Pat. No. 3,993,563, may each include one or more gas draft tubes to transfer gas into the rotor assembly of mechanism 32 from the vapor space in the upper portion of vessel 12. Gas ingesting and mixing mechanisms 32 may also include water draft tubes to transfer water into the rotor assemblies of mechanisms 32 exclusively from the bottom of the vessel 12. Inclusion of the water draft tube facilitates capacity variations within the same geometry because all water that enters the rotor assembly is directed to the rotor suction from the bottom of vessel 12, reducing fluid by-pass and short circuiting of the fluid around the turbulent areas. The treated effluent flows out of vessel 12 via outlet 34 which may have a valve 36 therein. Flow through vessel 12 is maintained via pumps or innate system pressure (not shown).

At the top of partition 44 is a primary skim collection channel 40 extending at least partially along the length of the top of partition 44, between first gasification chamber 18 and second gasification chamber 20 for collecting suspended matter in the upper portions of both gasification chambers 18,20. Skim collection channel 40, oriented normal to the plane of the FIGURE is generally a trough, and is illustrated as having a V-shaped cross-section in the FIGURE, although other trough contours and designs (e.g. U-shaped, etc.) would be acceptable. Froth level or liquid level 50 is designed to be right at upper edge 52 of channel 40 during collection of suspended matter in the upper portions of gasification chambers 18 and 20. Primary skim collection channel 40 receives contaminant-laden froth produced in the gasification chambers 18 and 20, and such froth is removed from the channel 40 through a primary skim outlet 54. There may be a skim outlet 54 on either or both sides of channel 40 in the vessel 12 side walls. The channel 40 may be tapered on the bottom (e.g. V- or narrow U-shaped) to permit a better removal of skimmings from the channel 40. The use of a common manifold or channel 40 for both gasification chambers 18 and 20 increases the efficiency of the apparatus 10 and reduces the capital cost of thereof. An open space 56 is provided above primary skim collection channel 40 to allow gaseous communication between each of the gasification chambers 18 and 20.

There is optionally provided at least one baffle 60 near primary skim collection channel 40 to dampen the motion of the liquid 14 caused by movement of the vessel 12, such as may be due to the motion of waves against the floating hydrocarbon recovery platform (not shown). Baffles 60 have a lowermost or distal edge 62. Vessel 12 maybe considered to have a horizontal plane, which may be parallel to the top and/or bottom of the vessel 12 as illustrated in the FIGURE. It has been discovered that if the angle A of a line between the upper edge 52 of channel 40 and the distal edge 62 of baffle 60 with respect to the horizontal plane of the vessel 12 is between about 5 and 15° that the motion of the liquid 14 will be dampened while permitting the oil and froth to flow over into channel 40. In a preferred, non-limiting embodiment of the invention, this angle A is about 10°.

A secondary skim collection channel or bucket 64 having a closed bottom, closed sides and an open top is located in an upper portion of inlet chamber 16, in one non-limiting embodiment on partition or wall 42. The secondary skim collection channel 64 is positioned to collect froth at a level 66, which may be, and is preferably, below level 50 in gasification chambers 18 and 20. Secondary skim collection channel 64 may also be tapered on the bottom and may have a V-shaped or U-shaped cross-section, as non-limiting embodiments. Secondary skim collection channel 64 may also remove froth through a secondary skim outlet 68. There may be at least one consolidating collection channel (a trough, pipe or the like), such as on the outside of vessel 12, in communication with both primary skim outlet 54 and secondary skim outlet 68 for delivering the collected suspended matter away from the vessel 12.

A tertiary skim collection channel 70, independent of both primary skim collection channel 40 and secondary skim collection channel 64, is located in the upper portion of discharge chamber 24. Tertiary skim collection channel 70 may be an "ISF-type" threaded pipe centrally located in chamber 24. Such a channel may be vertically adjustable to account for the difference in specific gravity between the liquid in the discharge chamber 24 and the gasification chambers 18 and 20. Further details on the induced static flotation (ISF) collection channel may be seen in U.S. Pat. No. 4,782,789, incorporated by reference herein. Tertiary skim collection channel 70 may be in communication with the consolidating collection channel which collects froth from primary skim outlet 54 and secondary slim outlet 68, or may have its own collection channel or pipe for delivering suspended matter away from vessel 12.

There may also be present a control mechanism, such as a programmable logic controller (PLC) 72 for controlling the liquid level in the first and second gasification chambers 18, 20, by obtaining level information from level transmitter (LT) 74 and regulating flow through level control valve (LCV) 28 which is in fluid communication 26 between outlet chamber 22 and discharge chamber 24. Level transmitter 74 may, in one non-limiting embodiment, have its sensor positioned in the opening beneath partition 44.

Similarly, the control of fluid level 76 in discharge chamber or box 24 is accomplished through PLC 72 by obtaining level information from LT 78 and regulating flow through LCV 36 in outlet 34. The exact nature of the level transmitters 74 and 78, PLC 72 and LCVs 28 and 36 is not critical and may be conventional in the art; however, their implementation in the dual-cell mechanical flotation system of the invention is expected to be inventive.

An important feature of the invention is intermittent skimming by raising the skim level (e.g. froth levels or fluid levels 50, 76 and/or 66) in order to remove the suspended matter or skim oil for high pitch and roll conditions on a floating production platform. It will be appreciated that on a floating offshore hydrocarbon recovery platform (or any other environment subject to excessive motion) it is possible for excessive wave action, such as during storms, hurricanes and other conditions that the platform may pitch and/or roll excessively. By "excessively" is meant to the detriment of the present method of clarifying water. That is, during consequent pitching and/or rolling of system 10, some clarified water would be undesirably collected by primary skim channel 40, secondary skim collection channel 64, and/or tertiary skim collection channel 70, caused by froth levels or fluid levels 50, 66 and/or 76 splashing over or sloshing over excessively into these channels.

This waste of clarified water may be minimized by controlling froth levels or fluid levels 50, 66 and/or 76. The control of the height of these levels may be through PLC 72 via LCV 28 and/or LCV 36 in response to pitch and/or roll data collected by pitch and roll sensor schematically illustrated at 80. It will be appreciated that the exact nature of pitch and roll sensor 80 is not critical and may be achieved by various angle or pitch sensors conventionally available. It is not necessary that pitch and roll sensor 80 be a single device, but may be two or more devices.

It will be appreciated that there are at least two embodiments of intermittent or ramped skimming in contrast to maintaining the fluid or froth levels at a constant or consistent height. In one embodiment, the froth level 50 may be normally maintained or kept at a height below the upper edge 52 of primary skim collection channel 40, and then intermittently raised for collection only when pitch and roll sensor 80 detects a sufficiently stable situation, or vessel 12 is sufficiently level. Alternatively, the froth level 50 may be normally maintained or kept at a height right at the upper edge 52 of primary skim collection channel 40 (that is, always or normally collecting suspended matter), and then intermittently lowered for only when pitch and roll sensor 80 detects an excessive pitch and/or roll situation, i.e. vessel 12 is undesirably tilted. An even more sophisticated control 72 may operate between these two embodiments. Desirably, PLC 72 is programmed to make appropriate changes in liquid levels before the pitching or rolling motion becomes excessive. It will be understood that raising froth level 50 for collection of suspended matter will not be regular or periodic due to the unpredictable and irregular nature of wave action on the offshore platform.

It will be appreciated that although the above discussion is focused upon froth level 50, that corresponding considerations apply to froth level 66 in inlet chamber 16 and fluid level 76 in discharge chamber 24.

In one embodiment of the invention, the mechanical flotation system 10 has a dual-cell design, that is, only two gasification cells, 18 and 20 as illustrated in the FIGURE. Previously, in a system with four cells, the retention time in each cell or chamber is about 1 minute, and efficiencies of 95% may be obtained. In the present invention, using only two gasification chambers or cells and a residence time in each chamber of about 2.0 to 2.5 minutes, the efficiency achieved of about 92% is almost as good, but at much less power utilization. That is, with the inventive apparatus, while efficiency is slightly reduced, the horsepower requirements are about half that of a conventional system (since only two gas ingesting/mixing mechanisms are required instead of four), and the "foot-print" or area consumed by the apparatus is reduced by nearly half—an important consideration on an offshore oil platform where space is at a premium.

An optional chemical feed unit (not shown), which is a standard feed unit for dispensing a metered amount of a flocculent chemical, using a polymer or a demulsifier, into fluid 14, to initially treat the influent for achieving optimum separation of contaminants from the water can be provided.

Although not shown, valves may be provided for blowdown of sludge that collects in the bottom of vessel 12. Also not shown are optional gauges to monitor the pressure of the effluent and the flow of gas.

In the method of the invention, a continuous flow of liquid 14 having suspended matter mixed therewith is introduced into inlet chamber 16 through inlet 30. Some separation of the suspended matter occurs in inlet chamber 16 by floating to the upper portion of inlet chamber 16 and floating froth level 66. This froth or suspended matter is collected in secondary skim collection chamber 64 and passed through secondary skim outlet 68 to a consolidating collection channel away from vessel 12. As noted, in one embodiment of the invention, froth level 66 may be controlled in a manner similar to that of froth level 50 or fluid level 76. That is, during periods of undesirable or detrimental pitch or roll, froth level 66 may be lowered below secondary skim collection chamber 64 and then ramped up or intermittently raised during or for collection. Controls for changing level 66 are not shown, but would be similar to those for controlling froth level 50 or fluid level 66.

Fluid 14, still containing considerable suspended matter, underflows partition 42 into first and second gasification chambers 18 and 20 where a flow of gas is introduced into the liquid 14 in the chambers by gas ingesting and mixing mechanisms 32, creating a turbulent area in the entirety of chambers 18 and 20, and allowing the gas to attract the suspended matter and carry it to the upper portion of vessel 12 where it floats at level 50. This suspended matter is collected in primary skim collection channel 40 that extends at least partially along the top of partition 44 between chambers 18 and 20 when froth level 50 is raised or ramped for intermittent collection by PLC 72. The suspended matter is delivered through primary skim outlet 54 to the collection channel, which may be the same or different consolidating collection channel serving secondary skim outlet 68. Level 50 is generally expected to be somewhat higher than level 66. At least one baffle 60 near the primary skim collection channel 40 dampens the motion of the fluid 14 that occurs when vessel is rocked or moved in response to waves hitting the hydrocarbon production platform.

Fluid 14, largely free of suspended matter, next underflows partition 46 and flows into outlet chamber 22. Passage of the fluid 14 from outlet chamber 22 through pipe or fluid communication 26 is regulated by level control valve 28 in response to signals from PLC 72 according to a software program therein using information from level transmitter 74.

The fluid 14 in discharge chamber 24 is relieved of the remaining suspended matter by floating such matter to level 76 where it is collected by tertiary skim collection channel 70. Channel 70 may be of an ISF-type that is vertically adjustable to account for the difference in specific gravity between the liquid 14 in discharge chamber 24 and the liquid 14 in the gasification chambers 18 and 20. The rate at which clarified liquid is removed from discharge chamber 24 is regulated by LCV 36 in outlet 34 in response to software program commands in the PLC 72 employing data obtained from LT 78. Alternatively, or in addition to the vertical adjustment of channel 70, level 76 may be ramped or intermittently controlled by PLC 72 or other means to alternately collect suspended matter via channel 70 or maintain level 76 below channel 70 during periods of excessive pitch or roll.

To summarize, advantages of the invention include, but are not necessarily limited to a decreased "footprint" (decreased space requirements), reduced power requirements, reduced capital and operating costs, and improved tolerance to platform wave motion effects. These advantages are achieved through a two-cell, mechanical, cylindrical gas flotation machine with a special baffling design to minimize surface wave action. Dual and/or intermittent level control in some embodiments will ensure proper rotor submergence of the gas ingesting mechanism and provide a stable level at the froth surface to allow controlled skimming and enhanced performance. Efficiency is further increased by using a common skimming collection manifold or channel between the two gasification chambers. Use of draft tubes in connection with the gas ingesting and mixing mechanisms minimize short-circuiting over a wide range of capacities.

In the foregoing specification, the invention has been described with reference to specific embodiments thereof, and has been demonstrated as effective in providing a mechanical flotation system for removing suspended matter from liquids. However, it will be evident that various modifications and changes can be made thereto without departing from the broader spirit or scope of the invention as set forth in the appended claims. Accordingly, the specification is to be regarded in an illustrative rather than a restrictive sense. For example, the distances between the partitions and the volumes of the various chambers may be changed or optimized from that illustrated and described, and even though they were not specifically identified or tried in a particular apparatus, would be anticipated to be within the scope of this invention. Similarly, gas ingestion and mixing mechanisms, and level transmitting and control devices different from those illustrated and described herein would be expected to find utility and be encompassed by the appended claims. Further, liquid level control and skimming and collecting patterns or protocols different from those explicitly described here may nevertheless fall within the scope of the invention.

We claim:

1. An apparatus for removing suspended matter from a liquid, comprising:
   a) a vessel for receiving a flow of liquid having suspended matter therein;
   b) a plurality of partitions sequentially dividing the vessel into an inlet chamber, at least a first gasification chamber and a second gasification chamber, and an outlet chamber, each adjacent chamber fluidly communicating with one another;
   c) a discharge chamber having a fluid communication with the outlet chamber;
   d) an inlet to introduce the flow of liquid into the inlet chamber;
   e) a mechanism for ingesting and mixing gas into the liquid of each gasification chamber for creating a turbulent area and for attracting the suspended matter and for carrying the suspended matter to an upper portion of the vessel; the interface of the gas and liquid being a liquid level,
   f) a primary skim collection channel extending at least partially along the top of the partition between the first gasification chamber and the second gasification chamber for collecting suspended matter in the upper portion of both gasification chambers;
   g) a controller for regulating the height of the liquid level in response to the movement of the vessel; and
   h) an outlet for removing clarified liquid from the discharge chamber.

2. The apparatus of claim 1 further comprising a control mechanism for controlling the liquid level in the first and second gasification chambers by regulating flow through a valve in the fluid communication between the outlet chamber and the discharge chamber.

3. The apparatus of claim 1 further comprising a control mechanism for controlling the liquid level in the discharge chamber by regulating flow through a valve in the outlet from the discharge chamber.

4. The apparatus of claim 1 further comprising:
   j) at least one baffle near the primary skim collection channel to dampen motion of the liquid caused by movement of the vessel.

5. The apparatus of claim 4 where the vessel has a horizontal plane and where the baffle j) extends inwardly into the vessel from an interior top surface thereof to a lowermost distal edge, where a line between an upper edge of the primary slim collection channel and the distal edge of the baffle j) forms an angle with the horizontal plane of between 5 and 15°.

6. An apparatus for removing suspended matter from a liquid, comprising:
   a) a vessel for receiving a flow of liquid having suspended matter therein;
   b) a plurality of partitions sequentially dividing the vessel into an inlet chamber, at least a first gasification chamber and a second gasification chamber, and an outlet chamber, each adjacent chamber fluidly communicating with one another;
   c) a discharge chamber having a fluid communication with the outlet chamber;
   d) an inlet to introduce the flow of liquid into the inlet chamber;
   e) a mechanism for ingesting and mixing gas into the liquid of each gasification chamber for creating a turbulent area and for attracting the suspended matter and for carrying the suspended matter to an upper portion of the vessel, the interface of the gas and liquid being a liquid level;
   f) a primary skim collection channel extending at least partially along the top of the partition between the first gasification chamber and the second gasification chamber for collecting suspended matter in the upper portion of both gasification chambers;
   g) a secondary skim collection channel, independent of the primary channel, located in the upper portion of the inlet chamber;
   h) a tertiary skim collection channel, independent of the primary and secondary channels, located in the upper portion of the discharge chamber;
   i) an outlet for removing clarified liquid from the discharge chamber;
   j) at least one baffle near the primary skim collection channel to dampen motion of the liquid caused by movement of the vessel; and
   k) a control mechanism for controlling height of the liquid level in response to the movement of the vessel.

7. The apparatus of claim 6 further comprising a control mechanism for controlling the liquid level in the first and second gasification chambers by regulating flow through a valve in the fluid communication between the outlet chamber and the discharge chamber.

8. The apparatus of claim 6 where the vessel has a horizontal plane and where the baffle j) extends inwardly into the vessel from an interior top surface thereof to a lowermost distal edge, where the line between an upper edge of the primary skim collection channel and the distal edge of the baffle j) forms an angle with the horizontal plane of between 5 and 15°.

9. A method for clarifying liquid from suspended matter, the method comprising:
   a) providing a vessel having a plurality of partitions sequentially dividing the vessel into an inlet chamber, at least a first gasification chamber and a second gasification chamber, and an outlet chamber, each adjacent chamber fluidly communicating with one another, and a discharge chamber in fluid communication with the outlet chamber;
   b) introducing a flow of liquid having suspended matter into the inlet chamber through an inlet;
   c) introducing a flow of gas into each of the first and the second gasification chambers for creating a turbulent area, and for allowing the gas to attract the suspended matter and carry it to an upper portion of the vessel, the interface of the gas and liquid being a liquid level;
   d) maintaining the liquid level below a primary skim collection channel extending at least partially along the top of the partition between the first gasification chamber and the second gasification chamber;
   e) intermittently raising the liquid level and collecting suspended matter in the primary skim collection channel in response to the movement of the vessel; and
   f) removing clarified liquid from the discharge chamber.

10. The method of claim 9 further comprising controlling the liquid level in the first and second gasification chambers by regulating flow through a valve in the fluid communication between the outlet chamber and the discharge chamber.

11. The method of claim 9 further comprising controlling the liquid level in response to the movement of the vessel.

12. The method of claim 9 further comprising controlling the liquid level in the discharge chamber by regulating flow through a valve in an outlet from the discharge chamber.

13. The method of claim 9 further comprising:
   g) dampening the motion of the liquid near the primary skim collection channel with at least one baffle.

14. The method of claim 13 where g) dampening the motion of the liquid near the primary skim collection channel is accomplished with at least one baffle extending inwardly into the vessel from an interior top surface thereof, the baffle having a lowermost distal edge, where a line between an upper edge of the primary skim collection channel and the distal edge of the baffle, forms an angle with a horizontal plane of the vessel of between 5 and 15°.

15. The method of claim 9 where the residence time for each gasification chamber is between 2.0 and 2.5 minutes.

16. The method of claim 9 further comprising collecting suspended matter in a secondary skim collection channel, independent of the primary channel, located in the upper portion of the inlet chamber.

17. The method of claim 16 further comprising collecting suspended matter in a tertiary skim collection channel, independent of the primary and secondary channels, located in the upper portion of the discharge chamber.

* * * * *